(12) United States Patent
Vandervalk

(10) Patent No.: US 6,171,047 B1
(45) Date of Patent: Jan. 9, 2001

(54) SQUARE BALE LOADING PLATFORM AND PROCESSING APPARATUS

(76) Inventor: James Vandervalk, c/o P.O. Box 1178, Fort MacLeod, Alberta (CA), T0L 0Z0

( * ) Notice: Under 35 U.S.C. 154(b), the term of this patent shall be extended for 0 days.

(21) Appl. No.: 09/421,320

(22) Filed: Oct. 18, 1999

(51) Int. Cl.$^7$ ................................................. A01D 90/04
(52) U.S. Cl. ................... 414/24.5; 414/111; 414/489; 414/789.7
(58) Field of Search ................ 414/24.5, 789.7, 414/477, 478, 479, 480, 111, 489

(56) References Cited

U.S. PATENT DOCUMENTS

| | | | |
|---|---|---|---|
| 3,330,424 | * 7/1967 | Grey et al. | 414/24.5 |
| 4,295,772 | * 10/1981 | Zimmerman | 414/38 |
| 4,771,670 | * 9/1988 | Woerman | 83/861 |
| 5,025,992 | * 6/1991 | Niebur | 414/111 |
| 5,211,345 | * 5/1993 | Siebenga | 414/789.2 |
| 5,383,714 | * 1/1995 | Hunter | 414/24.5 |
| 5,507,612 | * 4/1996 | Siebanga | 414/111 |
| 5,542,803 | * 8/1996 | Driggs | 414/111 |
| 5,690,461 | * 11/1997 | Tilley | 414/111 |
| 5,984,606 | * 10/1999 | Meeks | 414/24.5 |

FOREIGN PATENT DOCUMENTS 1321982   9/1993   (CA) .

\* cited by examiner

*Primary Examiner*—Joseph A. Fischetti
(74) *Attorney, Agent, or Firm*—McFadden Fincham

(57) ABSTRACT

A bale loading apparatus, which includes a wheeled undercarriage having front and rear ends; a deck pivotally mounted by a pivot mount to the rear end of the undercarriage for supporting a row of bales thereon; and actuating component driven by a first drive to pivot said deck between a first generally horizontal position and a second generally vertical position. The apparatus also includes forks mounted to the rear of the deck, with the forks preferably composed of tines. The forks are positionable at substantially ground level and in a generally horizontal orientation when the deck is generally vertical. A conveyor is incorporated within the deck to convey a bale from the rear end of the deck to the front end thereof. A drive component is provided to drive the conveyor.

10 Claims, 7 Drawing Sheets

SQUARE BALE LOADING PLATFORM AND PROCESSING APPARATUS

FIELD OF THE INVENTION

The present invention relates to farm equipment for handling, transporting and processing large square bales of hay or straw. In particular, it relates to an apparatus for handling large bales having a square or rectangular cross-sectional profile, which are equally arranged in a stacked array on a farmer's field. The invention also relates to an apparatus for transferring such bales onto the flat bed of a trailer, for transport and subsequent separation or chopping by a processor integral with the apparatus.

BACKGROUND OF THE INVENTION

In modern farming, hay and straw is often harvested in large bales, which may be square or rectangular in section. These are typically left in place on the field after the baling operation and are often stacked two or more high. Typically, the stacked array of bales left on the field, or in a storage yard, be retrieved periodically, as required, and delivered to a cattle feeding station or the like. At the delivery end, the bales are then either chopped or separated to distribute the hay or straw to cattle or other livestock for feed or bedding. It is preferable that the entire operation be carried out with a single piece of equipment which picks up the bales from the field, places the bales on a towable flatbed trailer or the like for transport, and separates or chops the bales at the delivery point and discharges the hay or straw with sufficient force to emplace a suitable bed at a point remote from the device. Conveniently, such an apparatus is operable by a single operator, and is desirably readily towed behind and powered by a conventional tractor.

Conventionally, farmers transfer large hay bales from the field onto a flatbed trailer by means of a fork lift. A conventional fork lift, whether integrated into a tractor or otherwise, is not well suited for handling of stacked large bales, which may be stacked too high for a fork lift to safely and easily handle. In order to address this and other drawbacks of operating a separate lift, a forklift-type hoist may be integrated into a towable flatbed trailer or bale processor: Examples of an integrated fork lift/flatbed trailer arrangement are disclosed in patent numbers:

U.S. Pat. No. 5,090,630 (Kopecky et al.)
Soviet Union 1704694 A1 (Lith Agic Acad)
U.S. Pat. No. 4,597,703 (Bartolini)
U.S. Pat. No. 4,449,672 (Morlock et al.)

It has been proposed to provide a combination fork/trailer combination which is uniquely suited for handling stacked bale arrangements. For example, U.S. Pat. No. 5,211,345 (Siebenga) discloses a trailer undercarriage, which supports a long deck hinged to the rear end of the undercarriage. A bale processing means such as bale chopper is mounted at the front of the undercarriage. The deck is tiltable on the undercarriage by means of fluid driven rams, between a generally vertical position and a horizontal position. An array of prongs or forks extends from an end of the deck. When the deck is tilted into a substantially vertical position, the forks point rearwardly. The trailer in this position may be backed into a stacked array of bales, whereby the forks engage the base of the stack of bales. The deck when thus oriented must be longer than the height of the bale stack being loaded. As the deck is tilted downwardly, the forks lift and tilt the bale stack rearwardly towards the deck. The stack is brought to bear on the deck as the same reaches its horizontal position. When the trailer is towed to a feeding station or the like, the bales may transferred from the tiltable deck to the processor, by tilting the deck forwardly to permit the bales to slide onto the processor. A drop between the deck and the processor causes the bales to tumble by one turn (90°) as they drop from the deck of the trailer bed onto the processor deck, to expose a selected face of a bale to the processing means. The bales may then be chopped by means of the integral bale processor.

The above prior art arrangement suffers several potential drawbacks. First, the means by which bales are conveyed along the tiltable deck to transfer the bales from the deck onto the processor, relying on gravity to slide the bales along the deck, renders this aspect unreliable. It is desirable to provide a reliable, positive means to convey the bales along the deck into the processor. Second, it is not always desirable to cause the bales to tumble as they drop onto the processor deck. In some circumstances, the farmer may wish to directly transfer the bales onto the processor deck, in the same orientation as they rest on the tiltable deck. It is thus desirable to provide an arrangement whereby a farmer may select whether or not to tumble the bales in the transfer step. Further, there is no means provided in the prior art to prevent a stacked array of bales from toppling backwards, as the fork lift arrangement backs into the stack and engages the stack onto the tiltable deck. It is thus desirable to provide a means to temporarily fasten the bales to the deck as the same is tilted away from the vertical. Rearward toppling of the stack can be inconvenient, as it renders pickup of the bales difficult and may cause the bales to break; it is also dangerous, since the bales could injure a worker when they topple.

It is also desirable to provide a component of the bale handling apparatus for cutting the baling twine or wire as the bales are transferred onto the tiltable deck. The cutting operation should be performed in the same operation as the transfer of the bales from the field stack onto the trailer deck. This is a useful function in light of the tendency of baling twine on the lowermost bale to tangle as the bale shifts relative to the ground during the transfer. Finally, the bale processors of the prior art appear to be suitable only for grinding or chopping of bales. It is desirable to provide a means for separating rather than chopping of bales, in order to preserve relatively long lengths of straw, in an arrangement of the type characterized above.

SUMMARY OF THE INVENTION

An object of certain embodiments of the invention is to provide an improved bale handling apparatus for picking up rectangular bales that are resting in a field in a stacked pile, transporting same and processing the bales by way of chopping or separating the bales. More particularly, it is an object of the invention to provide a means for retrieving a stacked array of square bales, tilting the stack onto a trailer for carrying the bales in a row on the trailer bed, and subsequently conveying the bales along the trailer bed towards an integral bale processor, where the bales may be readily and reliably conveyed along the trailer bed. It is a further objective in certain other embodiments to provide a reliable means for releasably fastening the bale stack as the same is tilted onto the trailer bed, to reduce the risk of the stack toppling rearwardly. It is a further object in other embodiments to provide in such an apparatus a convenient means for severing the baling twine on at least one of the bales as the bales are transferred from the field stack onto the trailer bed.

The invention consists in one aspect of a bale loading platform, comprising:

a wheeled undercarriage having front and rear ends;

a deck pivotally mounted by a pivot mount to the rear end of said undercarriage for supporting a row of bales thereon;

actuating means such as a fluid-driven ram to pivot the deck between a first generally horizontal position and a second generally vertical position;

fork means such as an array of fork members mounted to a rear end of said deck, said fork means positioned generally horizontally at ground level when said deck is generally vertical;

conveyor means, associated with said deck such as by being incorporated within said deck, to convey a bale from a rear end of said deck to a front end thereof, and drive means to drive the conveyor and actuator means.

Conventional drive means, such as a power take off ("PTO") conveniently power the actuator and conveyor means.

Preferably, the apparatus further includes bale processing means mounted to the front end of the undercarriage. The processing means includes a processor deck for receiving bales from the conveyor. Preferably, the processor means comprises a rotatable drum having an array of flails pivotally mounted thereto for separating strands from the bale as an alternative to chopping the bale. The drum is mounted directly above the processor deck, whereby the bale may be confined between the processor deck and the drum. A pusher plate or other bale conveyor pushes the bale towards the drum such that the flails may act on a vertical face of the bale.

Preferably, the deck may be titled relative to the undercarriage by more than 90°, such that the deck may be positioned to angle downwardly and forwardly to effectively lower the front of the deck relative to the normal horizontal position of the deck. The lowering may be achieved by a lever arm actuated by a ram or the like, which raises or lower the front end of the deck relative to said frame about the deck pivot mount. In the position in which the front of the deck is lowered, the bales are carried directly onto the conveyor bed in the same general orientation as the bales sit on the deck. In the raised position, the bales drop from the main deck onto the conveyor onto said processor and will tend to tumble or rotate by about 90°.

In a further aspect, the invention comprises a tilting bale loading platform of the general type characterized above, including a retractable bale engaging means such as hook means mounted to the bale deck for temporarily engaging bales to the deck when the deck is tilted vertically so as to prevent toppling of the bale array during the bale engagement operation. The hook means may be retracted after the deck is returned to its horizontal position to release the hook means from the bales. When retracted, the hook means is fully out of the path of the bales on the deck. Preferably, the hook means is pivotally mounted to the deck.

In a further aspect, the bale loading platform includes a cutting means on at least one of the fork members for cutting bale twine from a lower face of at least one of the bales. Preferably the cutting means includes a sleeve member for slidable engagement on the fork means, plus a lock means to fix the position of the sleeve member on the fork member. The cutting means may comprise an elongate blade member spaced apart from and parallel to the fork member, the sharp edge of the blade member extending upwardly when the fork member is in its horizontal use position.

Preferably, the fork means are pivotally joined to the deck or undercarriage so as to permit the fork members to accommodate irregularities in the ground as the fork means engages a stack of bales. As well, the pivotal mount permits the fork means to rotate forwardly, towards the front end of the apparatus, as the bales are conveyed forwardly. Preferably, this forward rotation is gravity actuated. In this aspect, the cutting of the bale twine is achieved as the cutting means slices across a face of the bale during forward rotation of the fork means.

Having thus generally characterized the invention, the invention will now be described by reference to a detailed description of a preferred embodiment, having regard to the description and the accompanying drawings set out below.

DETAILED DESCRIPTION OF THE PREFERRED EMBODIMENT

Figure 1:
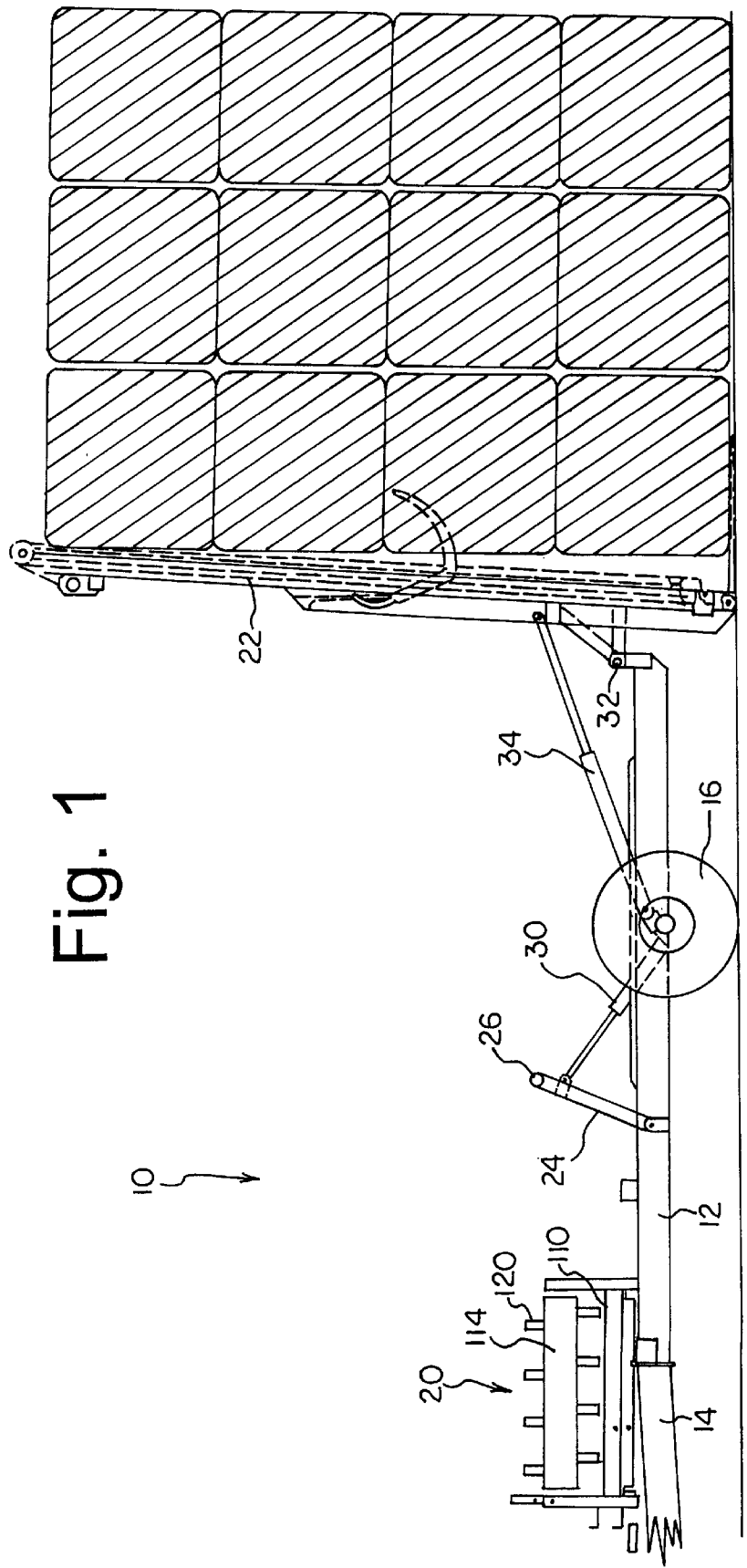
FIG. 1 is a side elevational view, showing the present invention in position to engage a stacked array of bales.
Figure 2:
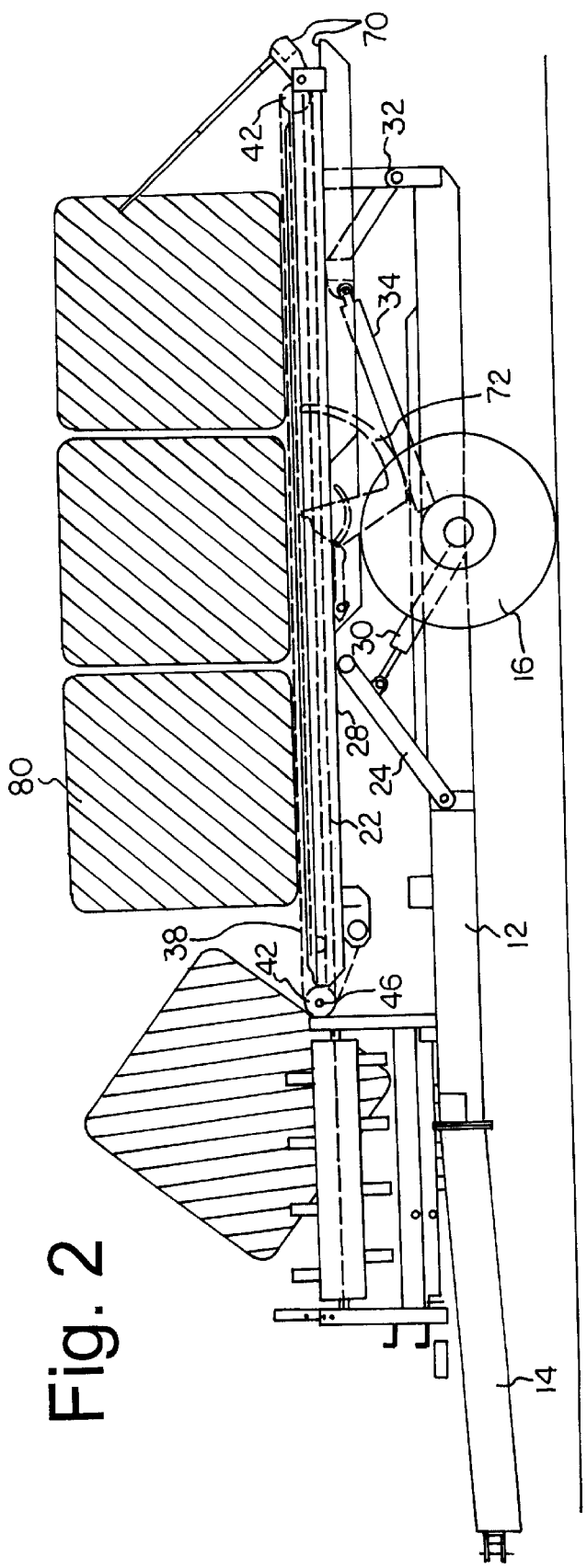
FIG. 2 is a side elevational view, with the deck in elevated, horizontal position.
Figure 3:
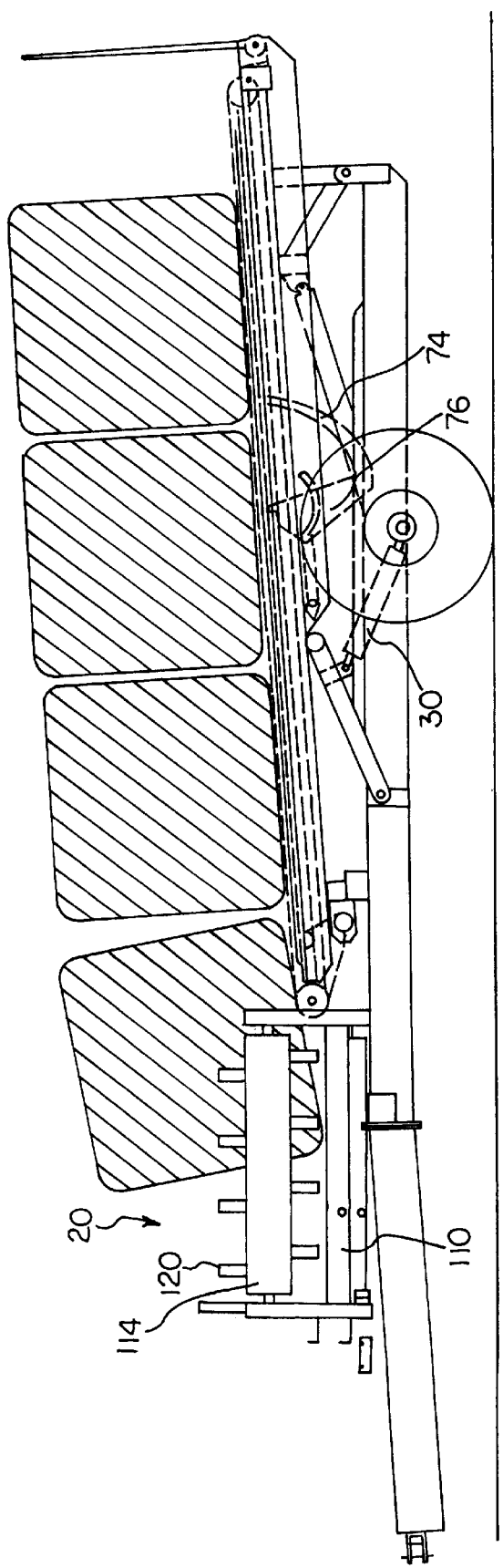
FIG. 3 is a side elevational view, showing the deck in a lowered, generally horizontal position.
Figure 4:
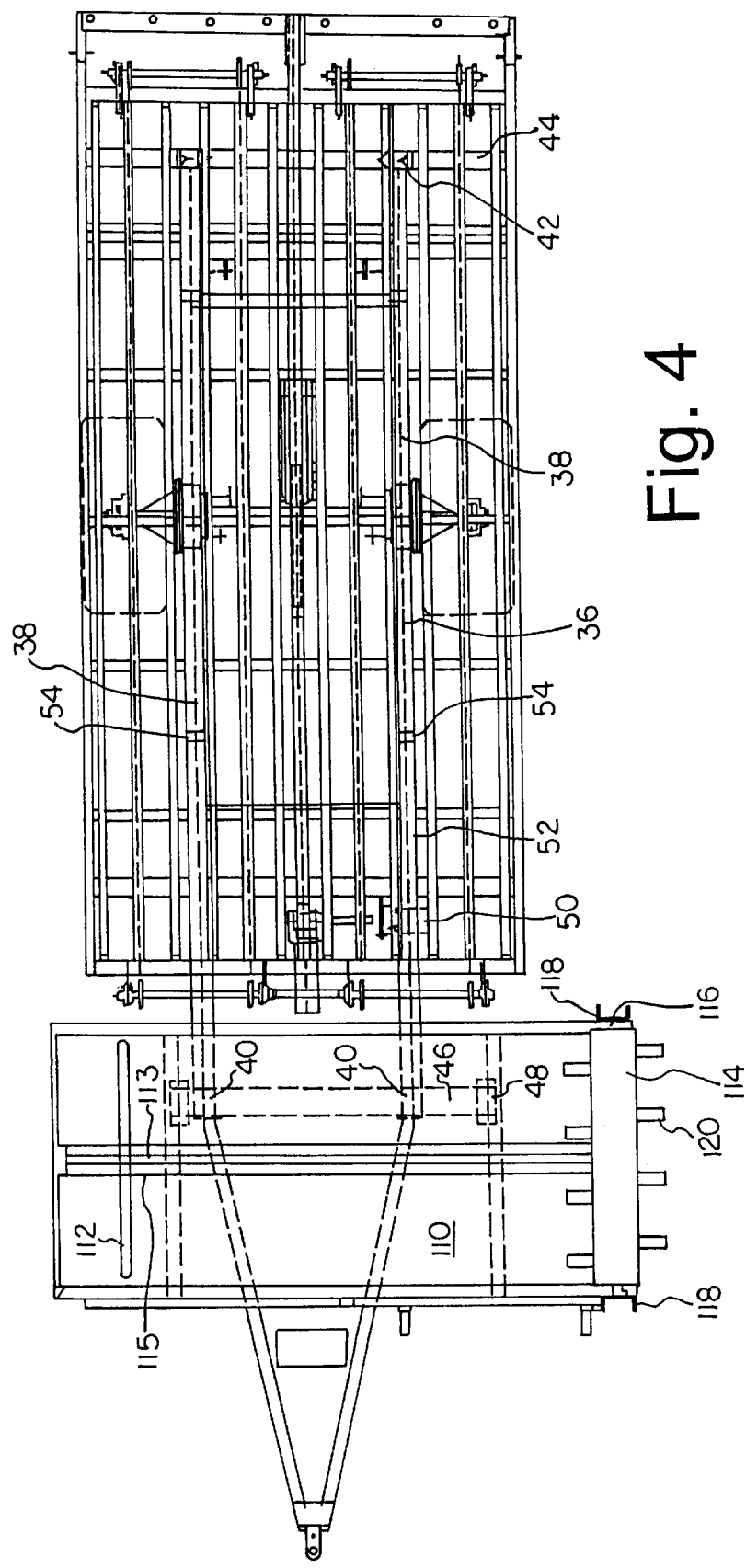
FIG. 4 is top plan view of the invention.
Figure 5:
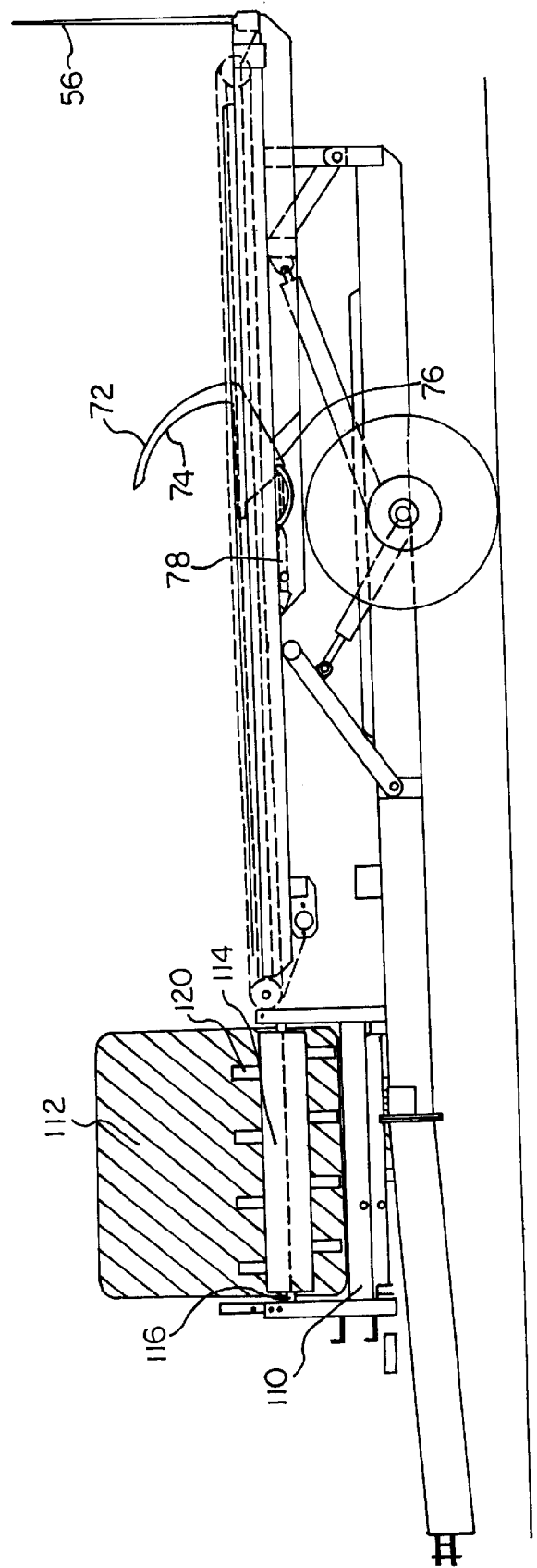
FIG. 5 is a side elevational view, showing the deck in an elevated, horizontal position.
Figure 6:
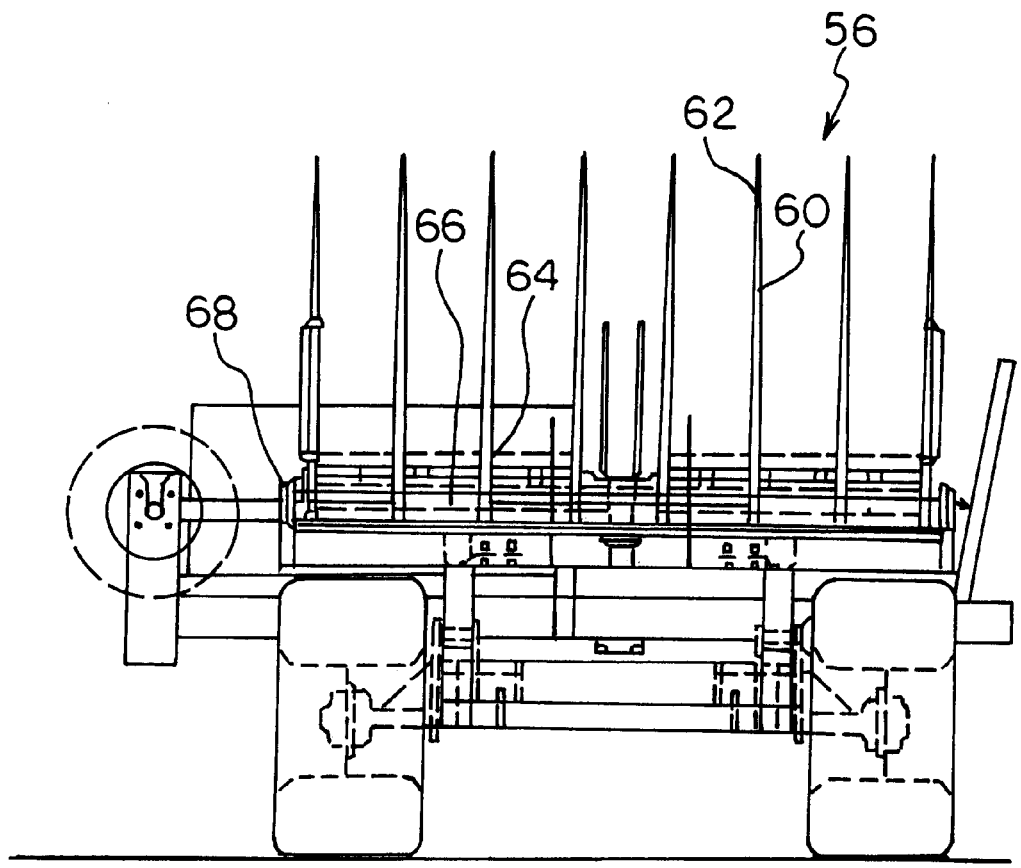
FIG. 6 is a rear elevational view.

Turning to FIGS. 1 through 6, a towable trailer 10 incorporating the present invention is provided. The trailer comprises a subframe 12, having at its front end (i.e., facing the tractor) a conventional hitch 14. The trailer is supported by a pair of wheels 16 which are mounted on respective sides of the subframe 14. The subframe is a conventional towable trailer frame, suitable for towing behind a tractor or the like. Typical trailer elements of brakes, lights, etc. are provided if required. A bale processor 20, which will be described in greater detail below, is mounted to the front end of the subframe. The subframe supports a superstructure composed of an elongate tiltable deck 22, which is pivotally mounted to a rear end of the frame, by way of a pivot mount 23. The deck 22, which is formed from an open framework composed of steel members, substantially covers a rearward portion of the subframe. The deck is supported at its front end on the subframe by means of a tiltable post 24 pivotally mounted at its lower end to the subframe 12. The post 24 extends upwardly from the subframe to contact the front region of the deck when the deck is fully lowered, as seen in FIG. 3. The post terminates in a sliding contact member 26, which engages a plate 28 within the deck when the same is lowered onto the post 24. A hydraulic ram 30 pivotally joins the post and the subframe and when actuated, selectively angles the post to effectively raise or lower the height of the post 24 relative to the subframe 12, which in turn raises or lowers the front end of the deck 22 relative to the subframe 12. It will be seen that positioning of the post in a relatively steeply angled position (FIG. 2) supports the deck such that it is generally parallel to the subframe and thus horizontal when the trailer is resting on level ground. Angling of the post more shallowly (FIG. 3) effectively permits the front of the deck 22 to lower, tilting the deck downwardly and forwardly.

The deck pivot mount 23 permits the deck to pivot between a first, generally vertical position for engaging a stacked array of hay bales, for example at a bale storage site, and a range of substantially horizontal positions as seen in FIGS. 2 and 3, for transporting and processing the bales. Pivotal movement of the deck is actuated by a fluid-driven ram 34, which pivotally joins the deck 22 to the frame 12. The pivot mount permits the deck to rotate about a vertical plane by greater than 90°, permitting the deck to angle forwardly an downwardly when the post 24 is lowered.

The deck 22 incorporates bale transport means 36, which consists of a pair of continuous conveyor chains 38, on either side of the deck, each rotatably driven between front and rear pulley members 40 and 42. The rear pulley members 42 are each rotatably journaled on an axle 44, for free rotation. The front pulley members 40 are fixedly mounted to a common transverse axle 46, which in turn is journaled for free rotation within bearing blocks 48 mounted to the deck 22. The axle 46 is rotatably driven by a motor 50 linked to the axle by conventional drive linkage means. Conveniently, the upper length of chain bears on a support surface such as a trough 52 or the like lined with a material such as nylon to present a low-friction bearing surface for the chains 38. The conveyor chains incorporate bale-engagement means, for example cross slats 54, to engage the bales in order to advance them forwardly along the deck, towards the bale processor when the chain drive is activated.

Pivotally mounted to the rear end of the deck is a bale fork assembly 56. The fork assembly 56 is rotatable between a storage position wherein the assembly lies generally flat on the deck, and a bale pick-up position, wherein the assembly joins the deck at an approximately 90° angle. The fork assembly consists of an array of elongated tines 60 each having a chisel-shaped and tapered exposed end 62. The bases 64 of the respective tines are fastened to a shaft 66, which in turn is rotatably journaled within bearing blocks 68 mounted to the deck 22 for free rotation of the shaft. The free rotation of the shaft permits the fork assembly to accommodate irregularities of the ground surface. Further, when the deck is positioned horizontally, the fork assembly will pivot forwardly to lie flat on the deck surface during transport. A stop member 70 prevents the fork assembly from tilting downwardly past a generally horizontal position, when the deck is vertical.

A retractable bale hook 72 is mounted to the middle region of the deck. The bale hook consists of a curved hook arm 74, joining a support 76. The support is pivotally mounted to one of the deck members. The hook is driven between a retracted position, wherein the hook is withdrawn from the deck surface (seen in FIG. 2), and an extended position as seen in FIG. 1 wherein the hook extends outwardly past the deck surface in a direction which is rearward when the deck is vertical. A hydraulic ram 78 pivotally joins the support to the deck, for actuating the retractable hook between the respective positions. In the extended position seen in FIG. 1, the bale hook may be plunged into the interior of a bale 80, in order to secure the bale to the tiltable deck to prevent toppling of the bale stack as the device retrieves a bale array. Conveniently, the bale hook 72 will be driven into the bale stack during the pickup process, at a stage when the bales are supported on the forks in a vertical stack before the deck is tilted away from the vertical. The bale hook may then be retracted below the deck level when the deck 22 tilts back to the horizontal.

The various hydraulic rams described herein are actuated by a source of hydraulic fluid, connected by conventional hydraulic lines to the rams. Control means such as one or more hydraulic pressure regulators control the operation of the various motor-driven and hydraulic components.

These control and drive means are not illustrated, as they are conventional and drawn to those skilled in this act. The procedure for loading a stack of bales 80 onto the deck 22 comprises the initial step of rotating the deck into the generally vertical position seen in FIG. 1, wherein the fork assembly 56 drops into a horizontal position. The trailer 10 may be then backed into a stacked array of bales 80, such that the fork assembly 56 slides under the bale stack. The bale hook 72 is then plunged into the stack to fasten the bale stack to the deck. The deck 22 is then tilted rearwardly, such that the stack is tilted rearwardly and is brought to bear on the deck, until the deck reaches a generally horizontal position, as seen in FIGS. 2 and 3. In this position, the stack of bales now rests onto its side and forms a row of bales extending along and resting on the deck. The horizontal deck position may be selected as either the fully horizontal position of FIG. 2, wherein the there is provided a substantial drop between the front of the deck and the bale processor 20, and the downwardly-tilting position of FIG. 3, wherein the front edge of the deck is generally level with the bale processor, although a slight drop down to the processor is acceptable. In the first position, the bales will tumble as they drop to the processor and land in a position 90° rotated from their position. In the second position, the tumbling will not occur. A 90° rotation may be desirable in order to expose a face of the bale which is not bound by twine to the processor drum. Alternatively, the farmer may elect to expose a bale in either an end-on (i.e. cross grain) position or parallel to the grain of the bale, depending on the extent of chopping or separating desired. The farmer may also elect to tumble the initial bales, but not rotate the final bale if the baling twine has been severed in the lowermost bale.

Figure 7:
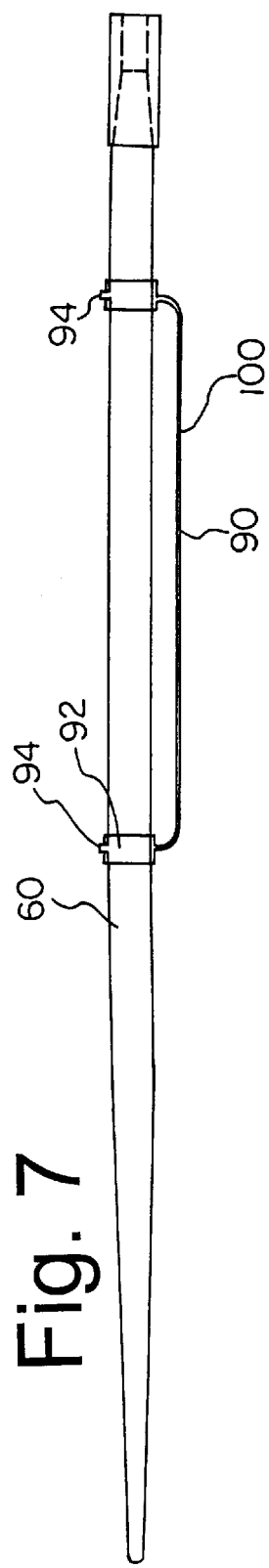
FIG. 7 is an elevational view of a fork member, illustrating the cutting member component on the fork member.
Figure 8:
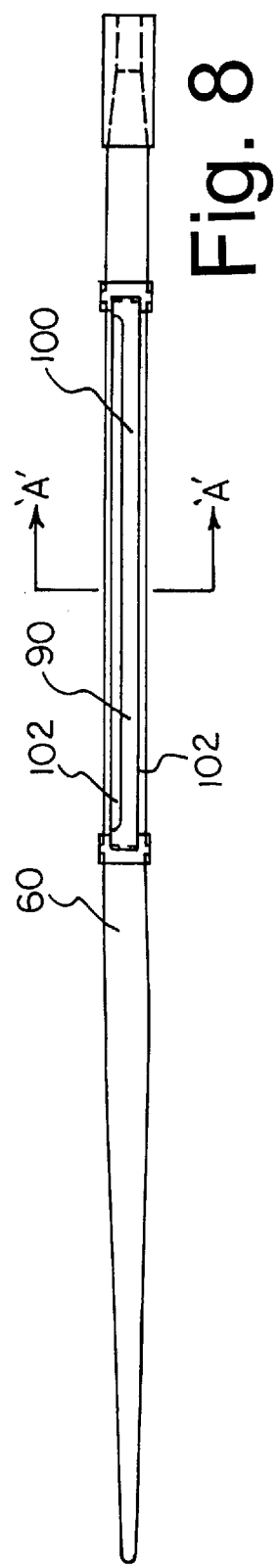
FIG. 8 is plan view of the member shown in FIG. 7.
Figure 9:
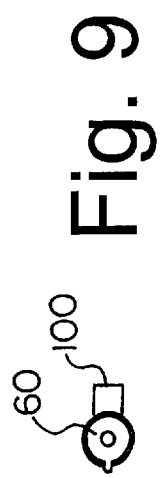
FIG. 9 is a sectional view, along line A—A, of the cutting member.

The outermost tines of the bale fork assembly are each provided with a blade member 90 which serves as a twine cutter, the purpose of which will be further described below. The blade member, seen more particularly in FIGS. 7–9, comprises a pair of sleeves 92 for slidable engagement with the corresponding tine. A set screw 94 within each of the sleeves locks the sleeve into position on the tine. A blade 100 extends between the two sleeves, and consists of a generally U-shaped band, the sides of which each form a sharpened edge 102. The blade member serves to slice the bale twine on the lowermost bale, which may become entangled as the bale is deposited on the ground during the baling or bale stacking processes. The cutting operation may be performed as the fork assembly slides under the lowermost bale during the bale pick-up process.

Forward rotation of the fork assembly is gravity-actuated. Since a portion of the fork assembly remains in contact with the bale array, a forward rotary motion occurs as the bales are conveyed or slide forwardly along the deck. The resulting sliding contact between the fork assembly and the rear most bale in the supported array, causes a sliding contact of the bale with the blade member 90, thereby causing the blade member to slice twine from the rear most bale. As well, the forward rotary motion of the fork assembly will serve to prevent rearward motion of the bale stack, once the fork assembly has dropped fully below the bale stack.

The bale processor 20 comprises a generally flat processor platform 110, having conveyor means incorporated therein to convey a bale deposited thereon, in a direction transverse to the trailer axis, towards a bale separator arrangement. The conveyor may comprise a chain-driven pusher plate 112, which engages a side of the bale and pushes the bale towards the separator. A continuous chain 113, driven by a motor (not shown) is fastened to the plate 112 to drive the plate from a first side of the platform 110 to a second side. The chain is supported on the platform surface by a recessed trough 115. Mounted along the second side of the processor is an elongate drum 114, mounted to an axle 116 which is journaled for rotation within bearing blocks 118. The drum axis is transverse to the direction of travel of the bales on the processor platform. The drum 114 is mounted directly above the processor deck such that there is a space between the level of the processor platform and the bottom of the drum to confine a portion of a bale therebetween. The drum is rotatably driven by conventional drive means such as a motor (not shown). An array of hinged flails 120 is mounted to the drum. The flails act on the vertical face of the bale 80 as the same is pushed against the drum, in order to separate the strands of straw from the face of the bale and discharge same from the processor, between the drum and the processor deck. A processor of this general type is described in Canadian Patent No. 2,167,664 (Vandenberg).

It will be seen that the bale processor may alternatively comprise a bale chopper for both separating and cutting the hay or straw strands of the bale. In this version, cutter means may be provided either on the drum (eg. U.S. Pat. No. 5,601,241 (Brewster)) or separately from the flail-carrying drum (eg. Canadian Patent No. 2,191,692 (Vandervalk)).

It will be seen by those skilled in the art to which this invention pertains that although the invention has been described by way of a detailed description of a preferred embodiment, departures from and variations to this arrangement may be made without departing from the spirit and scope of the invention, as the same is fully set out and characterized in the accompanying patent claims.

I claim:

1. A bale loading apparatus, comprising a wheeled undercarriage having front and rear ends;

a deck pivotally mounted by a pivot mount to the rear end of said undercarriage for supporting a row of bales thereon;

actuating means to pivot said deck between a first generally horizontal position and a second generally vertical position;

fork means mounted to a rear end of said deck, said fork means being positionable at substantially ground level and in a generally horizontal orientation when said deck is in said second generally vertical position;

conveyor means incorporated within said deck to convey a bale from said rear end of said deck to said front end thereof;

conveyor drive means to drive said conveyor means; and said fork means comprising an array of tines pivotally mounted to said deck and rotatable relative to said deck between one position for engaging a vertical stack of bales, and another position disengaged from said stack;

fork drive means to rotate said fork means between said one and another positions; and at least one cutting element mounted on at least one of said tines for cutting baling twine as said fork means are rotated between said one and another positions.

2. An apparatus as defined in claim 1, further including first drive means to drive said actuating means.

3. An apparatus as defined in claim 1, further including bale processing means mounted to said front end of said undercarriage, said processing means including a platform for receiving bales from said conveyor means.

4. An apparatus as defined in claim 3, wherein said pivot mount permits said deck to rotate beyond said generally horizontal position to tilt forwardly and downwardly, and wherein there is further provided moveable deck support means to selectively support said deck either wherein the front of said deck is lowered to about the same level as said bale processor platform, or a second position wherein the front of said deck is elevated above said platform sufficiently to permit said bales to rotate as they drop from said deck onto said platform.

5. An apparatus as defined in claim 4, wherein said deck support comprises a pivot-mounted post between said undercarriage and said deck.

6. An apparatus as defined in claim 1, further including a retractable bale engaging means mounted to said deck and rotatable between an extended position extending outwardly from the deck for engaging at least one of said bales to releasably fasten said bale to said deck when said deck is vertical and to prevent toppling of said bale array, and a retracted position wherein said, bale engaging means is fully retracted out of the path of bales contacting the deck.

7. An apparatus as defined in claim 6, wherein said bale engaging means is a hook pivotally mounted to said deck.

8. An apparatus as defined in claim 1, wherein said cutting element includes a sleeve member for slidable engagement on a tine of said fork means and a lock means to fix the position of said cutting element on said tine.

9. An apparatus as defined in claim 1, wherein said cutting element comprises an elongate blade member having a sharp edge spaced apart from and parallel to a tine of said fork means, the sharp edge of said blade means extending upwardly when said fork means is in a horizontal position.

10. An apparatus as defined in claim 3, wherein said bale processor further comprises:

a rotatable drum mounted directly above said platform;

drive means for rotating said drum relative to said apparatus;

flail means pivotally mounted to said drum to separate strands from said bale as said flail means act downwardly against a vertical face of said bale to confine said bale between said drum and said platform; and conveyor means to convey said bale along said platform, whereby said bale bears against said rotatable drum.

* * * * *